United States Patent
Kelly et al.

(10) Patent No.: US 10,097,351 B1
(45) Date of Patent: *Oct. 9, 2018

(54) GENERATING A LATTICE BASIS FOR LATTICE-BASED CRYPTOGRAPHY

(71) Applicant: ISARA Corporation, Waterloo (CA)

(72) Inventors: Shane Daniel Kelly, Waterloo (CA); Filip Kostis Pawlega, Waterloo (CA); Kassem Kalach, Waterloo (CA)

(73) Assignee: ISARA Corporation, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/719,235

(22) Filed: Sep. 28, 2017

Related U.S. Application Data

(63) Continuation-in-part of application No. 15/499,584, filed on Apr. 27, 2017, which is a continuation of
(Continued)

(51) Int. Cl.
*H04L 9/08* (2006.01)
*H04L 9/30* (2006.01)
(Continued)

(52) U.S. Cl.
CPC .......... *H04L 9/0869* (2013.01); *H04L 9/0816* (2013.01); *H04L 9/0838* (2013.01);
(Continued)

(58) Field of Classification Search
CPC ... H04L 9/0869; H04L 9/0816; H04L 9/0838; H04L 9/0852; H04L 9/14; H04L 9/16; H04L 9/30; H04L 9/3093
See application file for complete search history.

(56) References Cited

U.S. PATENT DOCUMENTS 8,059,814 B1   11/2011   Duane
9,032,212 B1   5/2015    Juels
(Continued)

FOREIGN PATENT DOCUMENTS

WO   2016005075   1/2016

OTHER PUBLICATIONS

Chinmay Shah (Research on Electronic Travel Document Protocols using Lattice-based Cryptography, 2015, 91 page) (Year: 2015).*
(Continued)

*Primary Examiner* — Oleg Korsak
(74) *Attorney, Agent, or Firm* — Henry Patent Law Firm PLLC

(57) ABSTRACT

In a general aspect, a lattice basis parameter for a lattice-based cryptography system is generated. A first parameter for the lattice-based cryptography system is obtained. The first parameter includes a first set of values. Pseudorandom data is obtained from a pseudorandom generator. The lattice basis parameter is generated based on the first parameter and the pseudorandom data. The lattice basis parameter includes a second set of values. The second set of values includes a first subset and a second subset. The first subset are selected from the first set of values; the second subset are generated based on the pseudorandom data, independent of the first parameter. The lattice basis parameter is used to execute a lattice-based cryptography protocol in a communication system.

20 Claims, 3 Drawing Sheets

Related U.S. Application Data application No. 15/266,965, filed on Sep. 15, 2016, now Pat. No. 9,673,977.

(51) Int. Cl.
  *H04L 9/14* (2006.01)
  *H04L 9/16* (2006.01)

(52) U.S. Cl.
  CPC .............. *H04L 9/0852* (2013.01); *H04L 9/14* (2013.01); *H04L 9/16* (2013.01); *H04L 9/30* (2013.01); *H04L 9/3093* (2013.01); *H04L 2209/24* (2013.01)

(56) References Cited

U.S. PATENT DOCUMENTS

| | | |
|---|---|---|
| 9,432,340 B1 | 8/2016 | Tutt |
| 9,673,977 B1 | 6/2017 | Kalach |
| 9,942,040 B1 | 4/2018 | Kalach |
| 2002/0141591 A1 | 10/2002 | Hawkes |
| 2004/0071288 A1 | 4/2004 | Romain |
| 2005/0031122 A1 | 2/2005 | Vanstone et al. |
| 2005/0232424 A1 | 10/2005 | Dobranski |
| 2011/0219233 A1 | 9/2011 | Zhang |
| 2015/0180661 A1 | 6/2015 | Fujii |
| 2016/0117448 A1 | 4/2016 | Van De Craen |
| 2016/0149700 A1 | 5/2016 | Fu |
| 2016/0234011 A1 | 8/2016 | Bruno |

OTHER PUBLICATIONS

Micciancio (The Geometry of Lattice Cryptography, Feb. 16, 2012, 20 pages) (Year: 2012).*
"Adrian, D., et al., "Imperfect Forward Secrecy: How Diffie-Hellman Fails in Practice," 22nd ACM Conference on Computer and Communications Security (CCS '15), Denver, CO, Oct. 2015, 13 pages."
"Alkim, E., et al., "TESLA: Tightly-Secure Efficient Signatures from Standard Lattices," Cryptology ePrint Archive: Report 2015/755, dated Jul. 29, 2015, 25 pages."
"Aono et al., "Fast and secure linear regression and biometric authentication with security update," Crypology ePrint Archive, Report 2015/692, 2015".
"Bos, J., et al., "Post-quantum key exchange for the TLS protocol from the ring learning with errors problem," Cryptology ePrint Archive: Report 2014/599, dated Mar. 16, 2015, 29 pages."
"Canetti et al., "A forward-secure public-key encryption scheme," International Conference on the Theory and Applicatoins of Cryptographic Techniques, Springer Berlin Heidelberg, 2003".
"European Telecommunications Standards Institute (ETSI); Quantum Safe Cryptography and Security, ETSI White Paper No. 8, Jun. 2015, France, 64 pages."
"Fisher, R., et al., "Statistical Tables for Biologocial, Agricultural and Medical Research," Sixth Edition, Oliver and Boyd, London, Hafner Press, New York, 1963, 155 pages."
"Fluhrer, S., "Cryptanalysis of ring-LWE based key exchange with key share reuse," Cryptology ePrint Archive: Report 2016/085, dated Jan. 30, 2016, 7 pages."
"Fujioka et al., "Practical and post-quantumauthenticated key exchange from one-way secure key encapsulation mechanism," Proceedings of the 8th ACM SIGSAC symposium on information, computer, and communications security, ACM, 2013".

"Knuth, D., "The Art of Computer Programming," A Draft of Section 7.2.1.2: Generating All Permutations, Addison Wesley, dated Dec. 2004, 66 pages."
"Peikert, C., "How (Not) to Instantiate Ring-LWE," Cryptology ePrint Archive: Report 2016/351, dated Apr. 2, 2016, 30 pages."
"Regev, O., "On Lattices, Learning with Errors, Random Linear Codes, and Cryptography," Proceedings of the 37th annual ACM symposium on theory of computing, New York, May 2005, 10 pages."
"Singh et al. "Even More Practical Key Exchanges for the Internet using Lattice Cryptography," 2015".
"Singh et al., "Lattice based forward-secure identiy based encryption scheme with shorter ciphertext," Journal of Internet Services and Information Security (JISIS) 3, 1/2, pp. 5-19, 2013".
"Stehle, D. et al., "Making NTRUEncrypt and NTRUSign as Secure as Standard Worst-Case Problems over Ideal Lattices," Cryptology ePrint Archive: Report 2013/004, dated Jan. 3, 2013, 38 pages."
"USPTO, Office Action issued in App. U.S. Appl. No. 15/266,965 dated Dec. 1, 2016, 10 pages".
Alkim, Erdem, et al., "Post-quantum key exchange—a new hope", Cryptology ePrint Archive: Report 2015/1092, Dec. 7, 2015, 34 pages.
Arora, Sanjeev, et al., "New algorithms for learning in presence of errors", In Proceedings of the 38th International Colloquim Conference on Automata, Languages and Programming—vol. part I, ICALP'11, Berlin, Heidelberg, Springer-Verlag, 2011, pp. 403-405.
Bos, Joppe, et al., "Frodo: Take off the ring! Practical, quantum-secure key exchange from LWE", Proceedings of the 2016 ACM SIGSAC Conference on Computer and Communications Security, Jun. 27, 2016, 26 pages.
Brakerski, Zyika, et al., "(Leveled) fully homomorphic encryption without bootstrapping", ITCS '12 Proceedings of the 3rd Innovations in Theoretical Computer Science Conference (pp. 309-325), Jan. 8, 2012, 37.
Chen, Yuanmi, et al., "BZK 2.0: Better lattice security estimates", In Proceedings of the 17th International Conference on the Theory and Application of Cryptology and Information Security, ASIACRYPT'11, Berlin, Heidelberg, Springer-Verlag, 2011, pp. 1-20.
Galbraith, Stephen D., "Space-efficient variants of cryptosystems based on learning with errors", Accessed online Aug. 1, 2017 at https://www.math.auckland.ac.nz/~sgal018/compact-LWE.pdf, 2013, 14 pages.
Gentry, Craig, et al., "Homomorphic Encryption from Learning with Errors: Conceptually-Simpler, Asymptotically-Faster, Attribute-Based", Jun. 8, 2013, 25.
Gentry, Craig, et al., "How to Use a Short Basis: Trapdoors for hard Lattices and New Cryptographic Constructions", Stanford Univ, SRI Int'l, MIT, Aug. 25, 2008, 41.
Kirchner, Paul, et al., "An Improved BKW Algorithm for LWE with Applications to Cryptography and Lattices", Cryptology ePrint Archive: Report 2015/552, Jun. 29, 2015, 31 pages.
Singh, Vikram, "A Practical Key Exchange for the Internet using Lattice Cryptography", IACR Cryptology ePrint Archive, 2015, 31 pages.
USPTO, Non-final Office Action issued in U.S. Appl. No. 15/499,584 dated Jul. 18, 2017, 10 pages.
USPTO, Notice of Allowance issued in U.S. Appl. No. 15/266,965 dated Apr. 13, 2017, 47 pages.
USPTO, Notice of Allowance issued in U.S. Appl. No. 15/499,584 dated Dec. 7, 2017, 8 pgs.
USPTO, Notice of Allowance dated Feb. 7, 2018, in U.S. Appl. No. 15/499,584, 10 pgs.

* cited by examiner

GENERATING A LATTICE BASIS FOR LATTICE-BASED CRYPTOGRAPHY

CROSS-REFERENCE TO RELATED APPLICATIONS

This application is a continuation-in-part of U.S. application Ser. No. 15/499,584, entitled "Refreshing Public Parameters in Lattice-Based Cryptographic Protocols," filed on Apr. 27, 2017, which is a continuation of U.S. application Ser. No. 15/266,965, now U.S. Pat. No. 9,673,977, entitled "Refreshing Public Parameters in Lattice-Based Cryptographic Protocols," filed on Sep. 15, 2016; both of which are hereby incorporated by reference.

BACKGROUND

The following description relates to generating a lattice basis for lattice-based cryptography.

Cryptography systems are used to communicate securely over public channels. For example, some cryptography systems provide confidentiality by encrypting messages, and some cryptography systems provide authenticity through digital signatures. Cryptography protocols based on lattice problems have been introduced for potential improvements in security.

DETAILED DESCRIPTION

Figure 1:
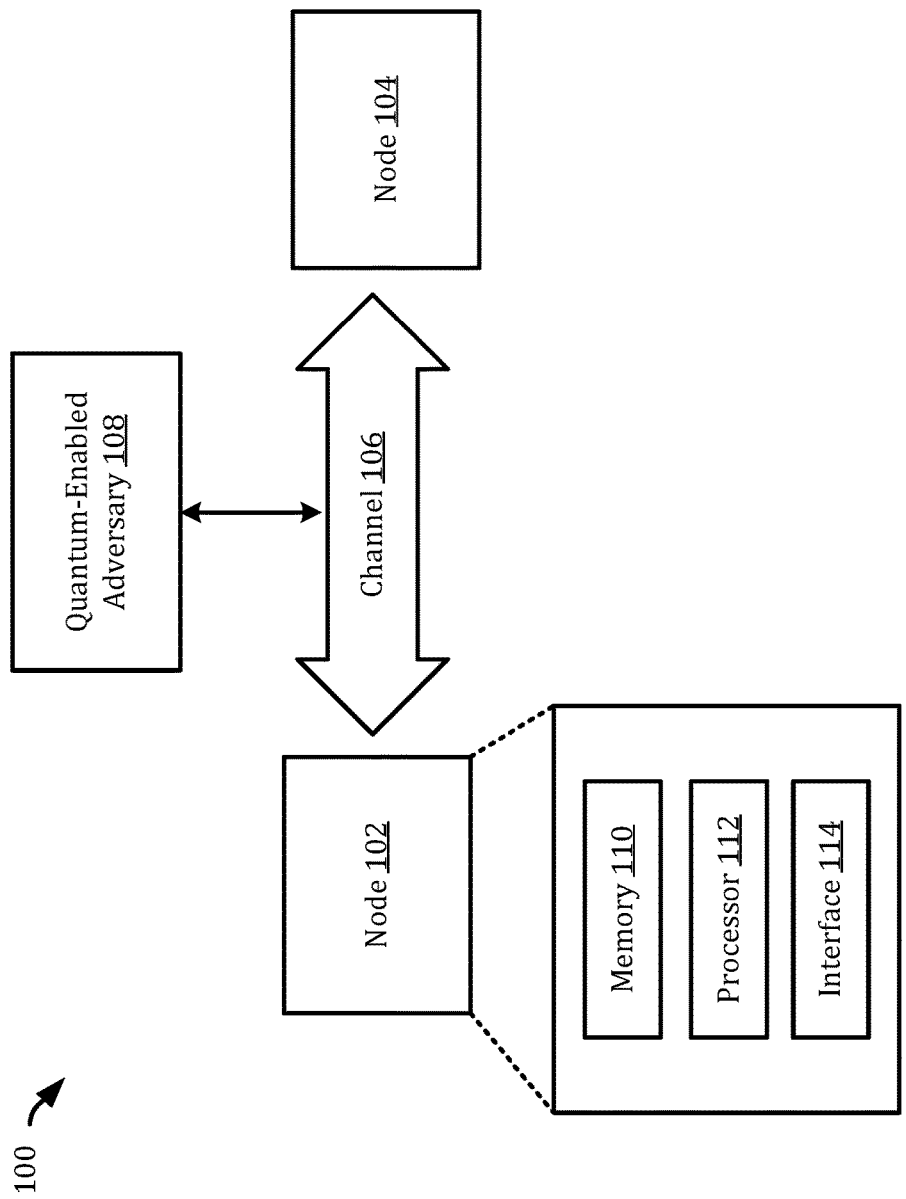
FIG. 1 is a block diagram showing aspects of an example communication system.

In some aspects of what is described here, a lattice basis parameter is generated and used in a lattice-based cryptography protocol. The lattice basis parameter can be generated, for example, by combining values from a global system parameter with random elements that are generated independent of the global system parameter. For instance, some elements of the lattice basis parameter can be populated from a global system parameter, while the other elements of the lattice basis parameter are generated pseudorandomly for one or more executions of a cryptography protocol. Generating the lattice basis parameter in this manner can reduce exposure to certain types of attacks while maintaining relatively low computational overhead. The techniques described here can improve performance of a lattice-based cryptography system, for example, by improving or optimizing the generation of new lattices (e.g., by seed expansion) while continuing to mitigate attacks that can be mounted against a fixed lattice.

In some implementations, the lattice basis parameter used in a lattice-based cryptography protocol is implemented as an array (e.g., a vector or matrix) or another collection of values that describes an instance of a lattice. For example, the ring-LWE protocol referred to as "New Hope" (see "Post-quantum key exchange—a new hope," by Erdem Alkim, Léo Ducas, Thomas Pöppelmann, and Peter Schwabe, March 2016) defines the lattice-basis parameter a as a vector of integers each less than a modulus value q. As another example, the standard LWE protocol referred to as "Frodo" (see "Frodo: Take off the ring! practical, quantum-secure key exchange from LWE" by Joppe Bos, Craig Costello, Léo Ducas, Ilya Mironov, Michael Naehrig, Valeria Nikolaenko, Ananth Raghunathan, and Douglas Stebila, June 2016) defines the lattice-basis parameter A as a square matrix of integers each less than a modulus value q. A lattice basis parameter may be defined in another manner.

Some existing proposals for lattice-based cryptography protocols define the lattice basis parameter as a constant, global system value that is the same for all cryptographic transactions. Making the lattice description a fixed global system parameter for all parties has the benefit that the information does not need to be transmitted or can be integrated at a hardware level. However, this approach also enables a possible "all for the price of one" attack, which is a type of geometric attack where a hypothetical significant advance in lattice basis reduction techniques allows an adversary with a large amount of computational resources to solve mathematical problems involving the shared global lattice which are presently intractable. A successful "all for the price of one" attack could enable the recovery of all private keys for all users, thereby invalidating the security of all users simultaneously, since they all share the same lattice instance.

Some existing proposals for lattice-based cryptography protocols generate the lattice basis parameter as an entirely new random matrix for each transaction, which makes geometric attacks prohibitively expensive even assuming significant algorithmic advances and powerful adversaries. For example, advances could render the cost of mounting an attack to compromise a single lattice instance economically viable, but not viable if the cost is incurred for each message sent by each user. However, sending the complete description of the entirely new random matrix for each new transaction incurs a high bandwidth penalty. In some proposals, only the initial seed for the pseudorandom data used to generate the new random matrix for each transaction is transmitted. A cryptographically strong pseudorandom function (e.g., ChaCha20 or AES) may then be used to produce the full lattice basis parameter from the seed. But this solution may incur unnecessarily high computational cost by generating all elements of the lattice basis parameter for each transaction. For example, 40% of the computational time for the (standard lattice) "Frodo" key-exchange system is spent on seed expansion as the first step of the algorithm.

In some implementations, the techniques described here can be used to develop new or improved cryptography systems or to achieve other technical advantages over existing proposals. For instance, rather than fixing the entire lattice, or generating the entire lattice from a seed, the lattice can be generated in a manner that balances tradeoffs for time, space, and security considerations. For example, we can think of using a matrix for our lattice basis parameter of the form A=B+C:B, C∈$Z^{n \times n}$, where B and C have non-zero entries at mutually exclusive indices. That is, B has some "holes" that C "fills in". In this case B is a fixed system parameter, and C is expanded from a seed for each distinct user or transaction, resulting in distinct values of the lattice basis parameter A for each seed. For example, if half the entries of B are 0, where the 0s represent the "holes", this implies a 50% improvement in performance, although not necessarily a 50% reduction in security. Various strategies can be used to decide which components should be fixed, how many should be fixed, etc., and the strategy can be developed to balance security requirements, bandwidth costs, computational costs, and other considerations.

FIG. 1 is a block diagram showing aspects of an example communication system 100. The example communication system 100 shown in FIG. 1 includes two nodes 102, 104. The nodes 102, 104 use a cryptography scheme to communicate with each other over a channel 106. In the example shown, a quantum-enabled adversary 108 has access to the channel 106, information exchanged on the channel 106, or both. In some instances, the quantum-enabled adversary 108 can transmit or modify information on the channel 106. The communication system 100 may include additional or different features, and the components in a communication system may be configured to operate as shown in FIG. 1 or in another manner.

In some implementations, nodes in the communication system 100 may have a server-client relationship. For example, the node 102 can be a server and the node 104 can be its client, or vice-versa. In some implementations, nodes in the communication system 100 may have a peer-to-peer relationship. For example, the nodes 102, 104 can be peers in a served network, in a peer-to-peer network or another type of network. Nodes may have another type of relationship in the communication system 100.

In the example shown in FIG. 1, the example nodes 102, 104 each have computational resources (e.g., hardware, software, firmware) that are used to communicate with other nodes. In some implementations, nodes in the communication system 100 can be implemented in various systems, such as, for example, laptops, desktops, workstations, smartphones, tablets, personal digital assistants, servers, server clusters, mainframes, IoT devices, and other types of computer systems. As shown in FIG. 1, the example node 102 includes a memory 110, a processor 112, and an interface 114. Each of the nodes 102, 104 may include the same, additional or different components. The nodes 102, 104 may be configured to operate as shown and described with respect to FIG. 1 or in another manner.

The example memory 110 can include, for example, random access memory (RAM), a storage device (e.g., a writable read-only memory (ROM) or others), a hard disk, or another type of storage medium. The example memory 110 can store instructions (e.g., computer code, a computer program, etc.) associated with an operating system, computer applications and other resources. The memory 110 can also store application data and data objects that can be interpreted by one or more applications or virtual machines running on the node 102. The node 102 can be preprogrammed, or it can be programmed (and reprogrammed), by loading a program from another source (e.g., from a DVD-ROM, from a removable memory device, from a remote server, from a data network or in another manner). In some cases, the memory 110 stores computer-readable instructions for software applications, scripts, programs, functions, executables or other modules that are interpreted or executed by the processor 112. For example, the computer-readable instructions can be configured to perform one or more of the operations shown in one or both of FIG. 2.

In the example node 102 shown in FIG. 1, the processor 112 is a data processing apparatus that can execute instructions, for example, to generate output data based on data inputs. For example, the processor 112 can run computer programs by executing or interpreting the software, scripts, programs, functions, executables, or other modules stored in the memory 110. In some instances, the processor 112 may perform one or more of the operations shown in FIG. 2.

The example processor 112 shown in FIG. 1 can include one or more chips or chipsets that include analog circuitry, digital circuitry or a combination thereof. In some cases, the processor 112 includes multiple processor devices such as, for example, one or more main processors and one or more co-processors. For instance, the processor 112 may include a main processor that can delegate certain computational tasks to a cryptographic co-processor, which may be configured to perform the computational tasks more efficiently than the main processor or in parallel with other computational tasks performed by other processor devices. In some instances, the processor 112 coordinates or controls operation of other components of the node 102, such as, for example, user interfaces, communication interfaces, peripheral devices and possibly other components.

In the example node 102 shown in FIG. 1, the interface 114 provides communication with other nodes (e.g., via channel 106). In some cases, the interface 114 includes a wireless communication interface that provides wireless communication using a wireless protocol or standard. For example, the interface 114 may provide wireless communication via Bluetooth, Wi-Fi, Near Field Communication (NFC), CDMA, TDMA, PDC, WCDMA, CDMA2000, GPRS, GSM, or other forms of wireless communication. Such communication may occur, for example, through a radio-frequency transceiver or another type of component. In some cases, the interface 114 includes a wired communication interface (e.g., USB, Ethernet) that can be connected to one or more input/output devices, such as, for example, a keyboard, a pointing device, a scanner, or a networking device such as a switch or router, for example, through a network adapter.

The example channel 106 can include all or part of a connector, a data communication network or another type of communication link. For example, the channel 106 can include one or more wired or wireless connections, one or more wired or wireless networks or other communication channels. The channel 106 may have any spatial distribution. The channel 106 may be public, private, or include aspects that are public and private. For instance, in some examples, the channel 106 includes one or more of a Local Area Network (LAN), a Wide Area Network (WAN), a Virtual Private Network (VPN), the Internet, a peer-to-peer network, a cellular network, a Wi-Fi network, a Personal Area Network (PAN) (e.g., a Bluetooth low energy (BTLE) network, a ZigBee network, etc.) or other short-range network involving machine-to-machine (M2M) communication, or another type of data communication network.

In the example shown, the quantum-enabled adversary 108 is a node in the communication system 100 that has access to quantum computational resources. For example, the quantum-enabled adversary 108 can be, include, or have access to a quantum computer, a quantum information processor, a quantum memory, a quantum communication interface or a combination of these and possibly other quantum technologies. In some implementations, the quantum-enabled adversary 108 can include a hybrid computing system, for instance, that includes a quantum processor driven by a classical front end processor, or another type of hybrid computing system.

In some examples, the quantum-enabled adversary 108 can store and process information in a quantum system. For instance, the quantum-enabled adversary 108 may encode information as quantum bits ("qubits") and process the information by manipulating the qubits. The information may be encoded in physical qubits, logical qubits, or a combination of these and other types of qubit encodings. In some implementations, the quantum-enabled adversary 108 can operate in a fault-tolerant regime, or the quantum-enabled adversary may operate below the fault-tolerant regime.

Many public key cryptography systems are known to be insecure against an attacker armed with a scalable quantum computer. For example, the Diffie-Hellman (DH) and elliptic curve Diffie-Hellman (ECDH) key agreement protocols are vulnerable to certain types of attacks by quantum-enabled adversaries. The threat of quantum computers to public key cryptography can be mitigated by switching to other public key cryptography systems that are believed to be invulnerable to quantum attack. For example, the "New Hope" and "Frodo" protocols referred to above have been proposed as a quantum-resistant replacement for contemporary key agreement protocols such as the Diffie-Hellman (DH) and elliptic curve Diffie-Hellman (ECDH).

In some implementations, the example quantum-enabled adversary 108 can perform quantum computing algorithms, execute quantum computing circuits or quantum communication protocols, or perform other types of quantum information processing tasks. In the example shown, the quantum-enabled adversary 108 can perform Shor's algorithm, which allows the quantum-enabled adversary to efficiently solve problems that are believed to be hard on a classical computer. For example, the quantum-enabled adversary 108 may use Shor's algorithm to factor large integers, find discrete logarithms or possibly to solve other problems in a computationally-efficient manner. Accordingly, the example quantum-enabled adversary 108 can compromise the security of certain quantum-vulnerable cryptography systems (e.g., by computing a private key of a certificate authority or other entity based on public information).

The example quantum-enabled adversary 108 shown in FIG. 1 can access information exchanged on the channel 106. For example, the quantum-enabled adversary 108 may access some or all of the information exchanged between the nodes 102, 104. In some instances, the quantum-enabled adversary 108 can directly observe correspondence on the channel 106; in some instances, the quantum-enabled adversary 108 indirectly obtains such correspondence, for example, by receiving information observed on the channel 106 by another entity or system.

In some implementations, the quantum-enabled adversary 108 can factor integers, compute discrete logarithms, or perform other classically-hard computational tasks fast enough to compromise the security of certain cryptography systems. For example, the quantum-enabled adversary 108 may be capable of computing prime factors fast enough to compromise certain RSA-based cryptography systems or computing discrete logarithms fast enough to compromise certain ECC-based cryptography systems.

In the example shown in FIG. 1, the nodes 102, 104 may use a quantum-resistant cryptography system that cannot be compromised by the example quantum-enabled adversary 108. For instance, the nodes 102, 104 may use a cryptography system that is secure against a quantum computer that can efficiently execute Shor's algorithm or other types of algorithms that are known to compromise the security of certain conventional cryptography standards.

In some implementations, the nodes 102, 104 use a digital signature scheme that allows each node to verify the authenticity of messages received from the other node, and the digital signature scheme can be a quantum-resistant scheme that is not vulnerable to the quantum computing resources of the quantum-enabled adversary 108. In some implementations, the nodes 102, 104 use an encryption scheme that allows each node to send confidential messages to the other node, and the encryption scheme can be a quantum-resistant scheme that is not vulnerable to the quantum computing resources of the quantum-enabled adversary 108. Such digital signature schemes and encryption schemes can include or be used in conjunction with a key agreement protocol that is also secure against attacks by the quantum-enabled adversary 108. In some examples, the nodes 102, 104 can use the example techniques shown in FIG. 2, or the nodes 102, 104 may use variations of these and other techniques to communicate securely on the channel 106.

In some implementations, the nodes 102, 104 use a lattice-based cryptography scheme in their communications over the channel 106. The security of lattice-based cryptography schemes is based on the apparent hardness of certain problems on point lattices in an n-dimensional Euclidean space $\mathbb{R}^n$. Some lattice-based cryptography schemes are believed to be secure against quantum-enabled adversaries. For example, it is believed that no efficient quantum algorithms are known for the hard problems typically used in lattice-based cryptography. Examples of lattice-based cryptography techniques include learning-with-errors-based (LWE) key agreement protocols, LWE encryption protocols, ring-learning-with-errors-based (Ring-LWE or RLWE) key agreement protocols, Ring-LWE encryption protocols, ring-learning-with-rounding-based (Ring-LWR or RLWR) key agreement protocols, Ring-LWR encryption protocols, NTRU algorithms (e.g., NTRUEncrypt, NTRUSign, etc.), Bimodal Lattice Signature Schemes (BLISS), PASS algorithms (e.g., PASSSign, etc.), TESLA (Tightly-secure, Efficient signature scheme from Standard LAttices) protocols, ring-TESLA protocols, and others.

Figure 2:
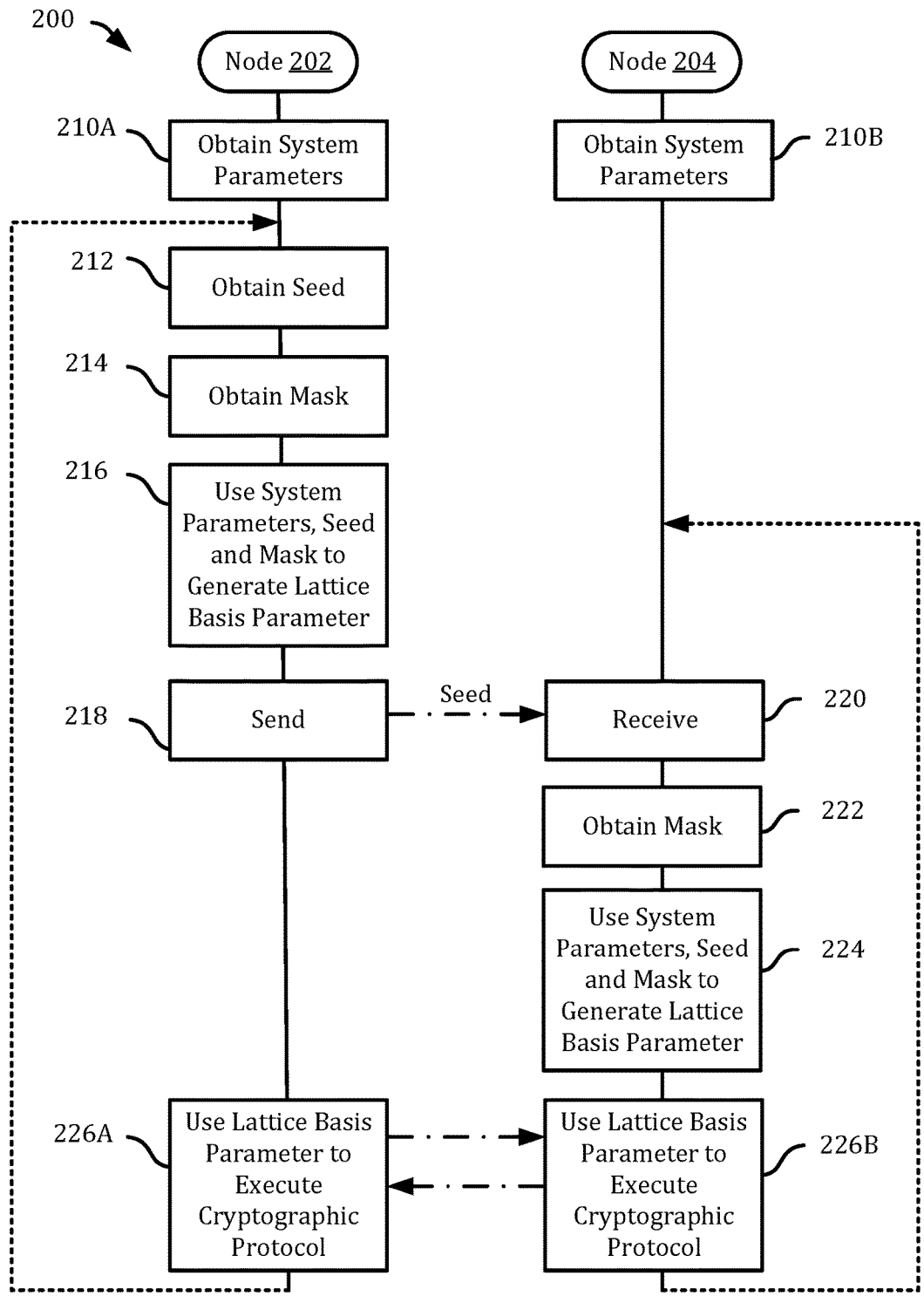
FIG. 2 is a flow diagram showing aspects of an example cryptography process.

FIG. 2 is a flow diagram showing aspects of an example cryptography process 200. The example process 200 shown in FIG. 2 can be performed, for example, by computer systems that can exchange information over a communication channel. For instance, operations in the process 200 may be performed by the nodes 102, 104 in the example communication system 100 shown in FIG. 1 or in another type of system. The example process 200 may include additional or different operations, including operations performed by additional or different entities, and the operations may be performed in the order shown or in another order. In some cases, one or more of the operations shown in FIG. 2 are implemented as processes that include multiple operations, sub-processes or other types of routines. In some cases, operations can be combined, performed in parallel, iterated or otherwise repeated or performed in another manner.

The example process 200 shown in FIG. 2 includes operations performed by nodes 202, 204. In the example shown, the nodes 202, 204 represent two distinct entities in a cryptography system. The cryptography system can be, for example, a Ring-LWE system (such as, for example, a system based on the "New Hope" proposal or another type of Ring-LWE protocol), a standard LWE system (such as, for example, a system based on the "Frodo" proposal or another type of standard LWE protocol), or another type of lattice-based cryptography system. In the example shown, the node 202 initiates a cryptography protocol, and sends public data to the node 204; the node 204 uses the public data to execute the cryptography protocol. In some cases, the nodes 202, 204 may have a server-client relationship, a peer-to-peer relationship or another type of relationship.

In some examples, the process 200 is secure against quantum-enabled adversaries such as, for example, the quantum-enabled adversary 108 shown in FIG. 1. For instance, in some cases, the example process 200 is secure against certain types of attacks or other processes that can be performed by a quantum-enabled adversary who has access to public information exchanged between the server 202 and the client 204. The example process 200 may also provide security against classically-enabled adversaries who do not have access to quantum computers or other quantum resources.

At 210A, 210B, the nodes 202, 204 each obtain system parameters for the lattice-based cryptography system. The parameters may include global system parameters as well as other parameters. In this example, values have been assigned to the global system parameters for all entities and protocols using the cryptography system. For instance, the lattice dimension n, the modulus q, and the error distribution χ are often designated as global system parameters for lattice-based cryptography systems. In the example shown in FIG. 2, the global system parameters include an array B. The other parameters obtained at 210A, 210B may include, for example, ephemeral values for certain parameters, user-specific values for certain parameters, or other non-global system parameters.

At 212, the node 202 obtains a seed value. The seed value can be a random seed for a pseudorandom generator. For example, the node 202 may select a seed value that includes 256 randomly-selected bits that can be used to seed a pseudorandom generator. Some example pseudorandom generators are programmed to produce pseudorandom data by applying a hash function or another type of function to the seed value. The hash function may be a secure hash algorithm, such as the SHAKE-128 or SHAKE-256 extendable-output functions. In some implementations, a strong pseudorandom generator is not necessarily needed for securely generating a lattice basis, and weaker non-cryptographic generators such as linear-feedback shift registers or the Mersenne twister algorithm may be adequate. In some examples, the pseudorandom generator can be represented as a pseudorandom function $f_s$ that has an internal state and uses the seed value as an initial input entropy seed s. Other types of pseudorandom generators may be used to generate pseudorandom data from the seed value obtained at 212.

In some implementations, the lattice-based cryptography system utilizes a pseudorandom generator that is implemented by a microprocessor or other data processing apparatus executing software (e.g., codes, scripts, programs, or other instructions). In some implementations, the lattice-based cryptography system utilizes a pseudorandom generator that is implemented by programmable hardware or logic circuits (e.g., an ASIC or FGPA, etc). Other types of pseudorandom generators may be used.

At 214, the node 202 obtains a mask. In some cases, the mask is one of the global system parameters obtained at 210A. In some case, the mask is generated by the node 202 for a particular transaction or environment. For example, all or part of the mask may be randomly generated each time a new lattice basis parameter is to be generated. The mask obtained at 214 can include a binary pattern that is completely fixed, fully or partially pseudo-randomly generated for each user or transaction, or completely ephemeral. For example, some, all or none of the binary pattern in the mask can be generated from pseudorandom data obtained from the pseudorandom generator. The binary pattern can be specified to meet basic security considerations regarding a minimum number of entries, not reducing the dimension of the lattice, and not leaving any sub-lattices intact.

In some examples, the mask is a fixed, public parameter (e.g., a global system parameter) for the lattice-based cryptography system. For instance, the fixed, public parameter can be a checkerboard pattern matrix or another type of pattern. A fixed binary pattern has the advantage of being efficient to compute, for example, computing the fixed binary pattern from a seed value.

In some examples, the mask is a random permutation matrix or another type of matrix generated based on a portion of the pseudorandom data. In contrast to the strategy where the elements of the lattice basis parameter that are freshly generated follow a fixed pattern, the binary pattern itself may be generated based on the output of a pseudorandom generator. This strategy may offer more security than a fixed pattern approach. The tradeoff can be more complex, for example, due to additional invocations of a pseudorandom function (PRF). This strategy may also limit how much of the matrix can be replaced with unique values. However, in some cases, a portion of the PRF calls may be replaced with less expensive, lower quality randomness, such as the output of a weak entropy source. For instance, some random elements of the matrix can be replaced with random values from the PRF, and the matrix can be further modified.

At 216, the node 202 uses the system parameters, the seed, and the mask to generate a lattice basis parameter. For example, the lattice basis parameter may be generated from a global system parameter and pseudorandom data obtained from the pseudorandom generator that has been seeded by the seed value. The mask can be used, in some cases, to identify elements of the lattice basis parameter to be populated from the global system parameter and elements of the lattice basis parameter to be populated (e.g., "filled in") from the pseudorandom data. In these and other cases, the lattice basis parameter is composed of a set of values that includes two subsets. The two subsets can be mutually exclusive subsets that together make up all elements in the lattice basis parameter, such that the two subset together constitute the entire the lattice basis parameter. The first subset can be selected from the set of values in the global system parameter, and the second subset can be generated based on the pseudorandom data, independent of the global system parameter. In some cases, when the lattice basis parameter is a matrix of values, the second subset can include at least one of the values in each row of the matrix, and at least one of the values in each column of the matrix. In some implementations, at 216, the lattice basis parameter may be generated without using a global system parameter.

In some implementations, the process 200 is performed in a cryptography system where the lattice basis parameter is defined as a matrix (such as, for example, a system based on the "Frodo" proposal or another type of standard LWE system). In such cases, a security parameter k can represent a desired security level (e.g., k=128 or another value), and the lattice basis parameter $A \in Z^{n \times m}$ can represent the basis for a lattice Λ(A) used (e.g., as a public key or otherwise) for the lattice-based cryptography system. Here, the lattice basis parameter is an n×m matrix, where m≥n. The pseudorandom generator can be represented as a pseudorandom function $f_s$ having an internal state, and the seed value obtained at 212 can be used as an initial input entropy seed $s \in \{0,1\}^k$. The mask obtained at 214 can be a mask matrix $P \in Z_2^{n \times m}$ that contains a pattern of binary values. For security reasons, it is recommended that P has weight ω≥m, distributed such that P contains an n-dimensional permutation matrix. For instance, the matrix mask P can be implemented as a square (m=n) permutation matrix. The mask matrix may be generated such that there exists a permutation matrix Q that is 0-padded to m columns, where all entries in P−Q are greater than or equal to 0. The weight ω refers to the number of non-zero entries in the mask matrix P. Choosing ω>>m may improve security further. An arbitrary fixed matrix $B \in_R$ $Z_q^{n \times m}$ can be provided as a global system parameter, and the lattice basis parameter A can be generated by an expansion algorithm. For example, the following expansion algorithm may be used:

A={0}$^{n \times m}$
for i∈[n] do
  for j∈[m] do
    if $P_{i,j}$==1 then
      $A_{i,j}=f_s(\bullet)$
    else
      $A_{i,j}=B_{i,j}$
Return A At the end of the example expansion algorithm shown above, A represents a partially fresh randomized matrix with exactly ω new entries, set according to the pattern of binary values in the mask matrix P. Since n·m−ω entries of A do not have to be generated ephemerally, the overall cost of generating the matrix is reduced by the amount of pseudorandom function (PRF) invocations that are no longer necessary. In an implementation with any fixed pattern, the matrix B can be implemented instead as a vector or another collection of values since some of its entries will never be used. In some cases, the mask matrix P can also be generated dynamically from a PRF, resulting in a spectrum of possible tradeoffs between using computational effort to generate the pattern, and the freshly pseudo-random values themselves. Security considerations can be used to designate a value or allowable range of values for the weight ω and the shape of the pattern itself.

In some implementations, the process 200 is performed in a cryptography system where the lattice basis parameter is defined as a vector (such as, for example, a system based on ideal lattices or a system based on the "New Hope" proposal or another type of Ring-LWE system). In such cases, an analogous process can be applied, where instead of matrices we take vectors to be coefficient embeddings of polynomials in $R_q [x]/(c(x))$ where c(x) is some n-degree polynomial modulus in x. Now, we have polynomials a, b∈$R_q [x]/(c(x))$: a=0, and a mask vector p∈$R_2 [x]/(p(x))$. The vector element $a_i$ can represent the i-th entry in the coefficient embedding of the lattice basis parameter a. An arbitrary fixed vector b can be provided as a global system parameter, and the lattice basis parameter a can be generated by an expansion algorithm. For example, the following expansion algorithm may be used:

a=0∈$R_q[x]/(p(x))$
for i∈[n] do
  if $p_i$==1 then
    $a_i=f_s(\bullet)$
  else
    $a_i=b_i$
Return a The lattice basis parameter may be generated in another manner in some cases.

In some implementations, the mask contains a binary checkerboard pattern, and the lattice basis parameter can be generated in a highly efficient manner. For instance, the checkerboard pattern may requires essentially no storage, and may be recovered from just an addition and a logical AND for each index of B. For example, a checkerboard matrix can be used as a mask to generate the lattice basis parameter A using the following procedure:

$$A = \begin{vmatrix} a_{0,0} & \cdots & a_{0,n} \\ \vdots & & \vdots \\ a_{n,0} & \cdots & a_{n,n} \end{vmatrix}$$

-continued $$a_{i,j} = \begin{cases} b_{i,j} & i+j \equiv 0 \pmod{2} \\ f_s(\cdot) & i+j \equiv 1 \pmod{2} \end{cases}.$$

This expansion algorithm can replace every second entry in a fixed public matrix B, with randomly generated entries.

At 218, the node 202 sends information to the node 204; and at 220, the node 204 receives the information that was sent by the node 202. In the example shown in FIG. 2, the node 202 may send information directly to the node 204, or the node 202 may initiate transmission indirectly, for example, through a server. All or part of the information can be transmitted over a public channel, and may be observed by a quantum-enabled adversary or another type of adversary. The information sent by the node 202 may include, for example, the seed value obtained at 212, the mask obtained at 214, or other information.

At 222, the node 204 obtains the mask. In the example shown in FIG. 2, the mask obtained by the node 204 (at 222) is the same as the mask obtained by the node 202 (at 214). The mask may be obtained, for example, based on the information received at 220, based on the global or other system parameters obtained at 210B, or the mask may be obtained in another manner. For instance, when the mask is a fixed, public value, the mask can be obtained with the system parameters at 210B. In cases where the mask is generated based on pseudorandom data, the pseudorandom data can be obtained from the pseudorandom generator seeded by the seed value received from the node 202 at 220.

At 224, the node 204 uses the system parameters, the seed, and the mask to generate the lattice basis parameter. In the example shown in FIG. 2, the lattice basis parameter generated by the node 204 (at 224) is the same as the lattice basis parameter generated by the node 202 (at 216). The nodes 202, 204 may use the same process to generate the lattice basis parameter. For example, the node 204 may execute (at 224) the operations that the node 202 executed at 216.

At 226A, 226B, the nodes 202, 204 use the lattice basis parameter to execute a lattice-based cryptography protocol. For example, the lattice basis parameter may be used to execute a lattice-based key agreement protocol, a lattice-based signature protocol or a lattice-based encryption protocol. In some implementations, the lattice-based cryptography protocol includes one or more of the other operations shown in FIG. 2. For instance, one or more the other operations (210A, 210B, 212, 214, 216, 218, 220, 222, 224) in the process 200 may be performed as part of the lattice-based cryptography protocol at 226A, 226B. Accordingly, although certain operations are shown separately in FIG. 2, all or part of the operations 210A, 210B, 212, 214, 216, 218, 220, 222, 224 may be performed at 226A, 226B by execution of the latticed-based cryptography protocol.

In some implementations, the lattice basis parameter can be combined with other values (e.g., a secret value, other system parameters, etc.) in a key agreement protocol to generate a shared secret. For instance, the "New Hope" and "Frodo" proposals provide example algorithms for generating a shared secret based on a lattice basis parameter. The lattice basis parameter may be used in other types of lattice-based cryptography protocols.

In some implementations, the lattice basis parameter is used in a lattice-based signature scheme (e.g., TESLA or its variants). The TESLA signature scheme was introduced as a variant of the Bai-Galbraith signature scheme, and a ring-based variant of TESLA, called ring-TESLA, has also been introduced. Public keys in the TESLA signature scheme and its variants contain a lattice basis parameter that is analogous to the lattice basis parameter a in New Hope. For example, TESLA and Bai-Galbraith signature schemes include a lattice basis parameter A that is a two-dimensional matrix with entries in $\mathbb{Z}_q$; and ring-TESLA signature schemes include a lattice basis parameter a that is an array with 512 elements.

In some implementations, the lattice basis parameter is used in a lattice-based encryption scheme. For example, the encryption schemes described in the following publications may be used: "How to use a short basis: trapdoors for hard lattices and new cryptographic constructions," by C. Gentry, et al., August 2008; "On lattices, learning with errors, random linear codes, and cryptography," by O. Regev, May 2009; "Homomorphic encryption from learning with errors: conceptually-simpler, asymptotically-faster, attribute based," by C. Gentry, et al., June 2013; "(Leveled) fully homomorphic encryption without bootstrapping," by Brakerski, et al., January 2012. Other types of encryption schemes may be used.

In some implementations, the process 200 can be executed in a manner that improves security, increases efficiency or provides other technical advantages. Here we provide a discussion of security and resource consideration in the context of generating the lattice basis parameter at 216, 224. For ephemeral lattice cryptography systems based on the "Learning with Errors" assumption, due to the restricted number of samples an adversary has access to, the attacks worth examining are the same geometric methods used for "all for the price of one" attacks, namely, lattice basis reduction. As long as secret keys themselves remain ephemeral, partially fixing the lattice basis parameter also does not create an advantage for sample collection style attacks either. Hence, for this discussion we focus attention on basis reduction techniques.

The most powerful known algorithm for basis reduction attacks is "BKZ 2.0"; the following discussion provides a high level overview of how these techniques work. Given an arbitrary lattice basis A for a lattice $\Lambda(A)$, a basis reduction algorithm $G: A^{n \times m} \to B^{n \times m}$ outputs a basis B with $\Lambda(A)=\Lambda(B)$ and $\|B\|_p \leq \|A\|_p$ for some $l_p$ norm. That is, G outputs a basis for the same lattice with shorter vectors. In the optimal case, $B=\{\lambda_1, \ldots, \lambda_n\}$ is simply the length-ordered list of the shortest vectors in the lattice. The optimal case of the BKZ 2.0 attack is unreachable by existing algorithms (for high dimensional lattices), which are only able to produce vectors that are still not "short" enough in practice to actually break lattice-based cryptography systems. Gram-Schmidt orthogonalization, which can be used to find orthonormal bases for arbitrary vector spaces, does not apply, as this procedure violates the discreteness property of lattices (the procedure does not preserve the lattice). The BKZ algorithm performs an enumerative block-wise reduction on the lattice, where the block size corresponds to the number of dimensions being operated at a time. Higher block-sizes result in shorter vectors (the quality of the reduction is higher), and are the main influence over the run-time of the algorithm. The BKZ procedure also requires the LLL (Lenstra-Lenstra-Lovasz) basis reduction algorithm as a subroutine, and requires its input to already be LLL-reduced.

The LLL basis reduction algorithm is a lattice basis reduction technique that does not perform as well as BKZ. One of the required properties of the algorithm output is that the basis vectors must be ordered in relation to the size of their Gram-Schmidt coefficients. These coefficients depend on both the lengths of individual vectors a∈A, as well as their corresponding Gram-Schmidt orthogonalizations a*. Since a* are recursively defined as projections onto the remaining basis vectors, if a non-negligible number of entries of the lattice basis are randomly generated then the LLL reduction of lattice basis is largely unpredictable, and does not benefit from any partial precomputation based on fixed entries of the lattice basis parameter. While the LLL reduced input to BKZ is an inexpensive portion of the overall computation, given that the rest of the algorithm relies heavily on the order of the vectors in the input basis implies that with a sufficient quantity of random basis entries, an adversary is not able to perform a useful reduction precomputation. Not only because there are missing values in the computation, but in particular because the order may change so drastically.

The LLL basis reduction algorithm also includes an enumeration procedure. The main phase of the BKZ algorithm iterates over "projected" sub-lattices $\Lambda(A_{[i,i+\beta]})$ of dimension $\beta$ (the input block-size to the algorithm), by performing an expensive tree search to obtain a single shorter vector in the sub-lattice until i+β equals the dimension of the lattice. The sublattice is essentially just a set of β adjacent columns of A. If this routine is successful, the vector found can be used to further improve the quality of the basis for the sub-lattice through additional LLL operations. Therefore, the algorithm heavily depends on which sets of vectors were input to each block of the enumeration procedure, i.e. the ordering of the initial LLL reduced basis.

The LLL basis reduction algorithm also includes a basis combination procedure. From the above, a lattice basis with a sufficient amount of unknown entries such that the ordering of its LLL reduced vectors is uncertain significantly impedes a basis reduction precomputation attack. However, for discussion purposes, we can view the final lattice as the sum of a static basis (e.g., the matrix B in the example shown in FIG. 3) and a dynamic basis (e.g., the matrix C in the example shown in FIG. 3). For the purposes of basis reduction we can essentially consider the missing entries of the matrix B as 0, and reduce it with a cost corresponding to a much lower dimension lattice. Similarly, we could reduce the matrix C once it is determined. Not using a fixed pattern approach almost certainly thwarts any possibility, given a fixed pattern for the mask matrix P for the matrix B, that the separate reductions of B and C can be composed through a function g(P, B, C) to create basis for A=B+C with sufficient quality, while remaining significantly less expensive than reducing A directly.

The technique used to generate the lattice basis parameter at 216, 224 can be designed based on consideration of the quantity, positioning, and entropy of the variable entries in the lattice basis. In some cases, the minimum number of entries that should be randomly chosen is the number of columns in the basis, e.g. n for a square matrix, in particular at least one entry per column, per row should be changed. For instance, modifying any single column may leave intact a sub-lattice that contributes a significant amount of information towards the final basis reduction (only one Gram-Schmidt vector changes). Since lattice bases are invariant under column permutation, many binary patterns are isomorphic up to column reordering. So it may be advantageous to leave no sub-lattices intact and to replace entries corresponding to the indices of an arbitrary permutation matrix—yielding up to n! $q^n$ distinct lattices. Using a larger number of random entries implies better security, and the amount can have a minimum value of n to ensure a threshold level of security. In some implementations, the number of distinct lattices that can be generated by the procedure has an upper bound since some lattice bases may be column permutations of each other, or may result in linear dependencies that lower the rank of the lattice (e.g. duplicate vectors), however these situations will happen with negligible probability for an appropriately sized modulus and lattice dimension.

Figure 3:
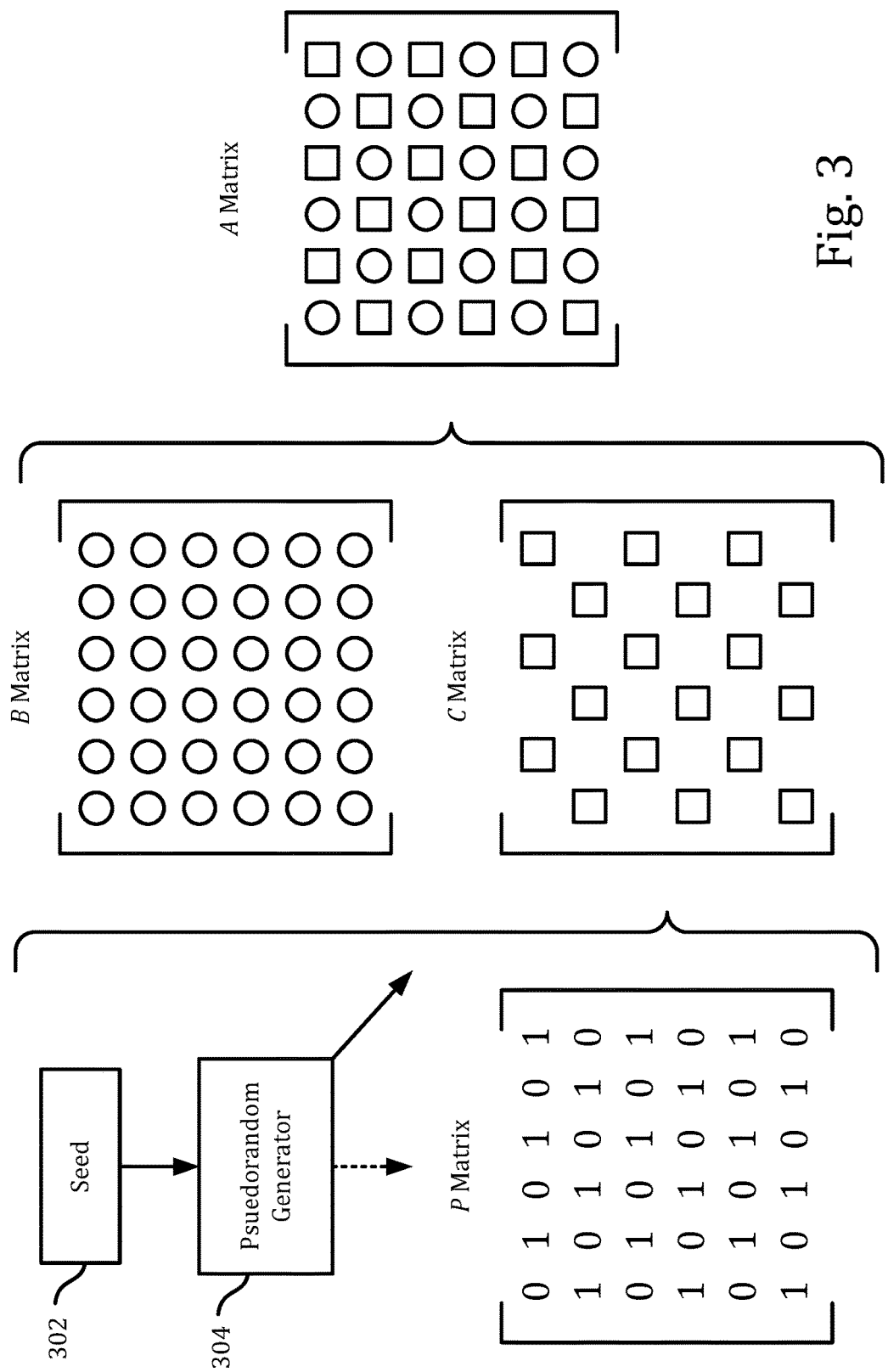
FIG. 3 is a schematic diagram showing an example technique for generating a lattice basis parameter.

FIG. 3 is a schematic diagram showing an example technique for generating a lattice basis parameter. The example technique shown in FIG. 3 can be used, for example, in the process 200 to generate the lattice basis parameter at 216, 224, or the technique may be used in another context.

As shown in FIG. 3, a seed 302 is provided as input to a pseudorandom generator 304. The seed 302 and pseudorandom generator 304 can be implemented as described with respect to FIG. 2. For example, the pseudorandom generator 304 can be represented as a pseudorandom function $f_s$ having an internal state, and the seed 302 can be used as an initial input entropy seed $s \in \{0,1\}^k$, where k is an integer representing a specified security level. Additionally or alternatively, the pseudorandom generator 304 can include another type of entropy source.

In the example technique shown in FIG. 3, a global system parameter matrix B, and data from the pseudorandom generator 304 are combined to form the lattice basis parameter matrix A. As shown, the lattice basis parameter matrix A includes matrix elements that have each been assigned a set of values. A first subset of values (shown as circles) in the lattice basis parameter matrix A are selected from the set of values in the global system parameter matrix B. A second subset of values (shown as squares) in the lattice basis parameter matrix A are generated based on the pseudorandom data, independent of the global system parameter (B).

In the example shown in FIG. 3, locations of the respective first and second subsets of values within the lattice basis parameter matrix A are identified by the binary pattern in the mask matrix P. For instance, the first subset of values (shows as circles) can be selected from the global system parameter matrix B based on the binary pattern in the mask matrix P, and the second subset (shown as squares) can be generated without reference to the global system parameter B. In the example shown, for each position in the lattice basis parameter matrix A, if the mask matrix P has a "0" at the corresponding position, the value from the corresponding position in the global system parameter matrix B is assigned to that position in the lattice basis parameter matrix A; but if the mask matrix P has a "1" at the corresponding position, a value derived from the pseudorandom data is assigned to that position in the lattice basis parameter matrix A. As such, in the example, the value "0" in the binary pattern indicates the locations of elements of the global system parameter matrix B that are directly assigned to corresponding locations in the lattice basis parameter matrix A (elements that are not newly generated) when the lattice basis parameter matrix A is generated; and the value "1" in the binary pattern indicates the locations of elements of the lattice basis parameter matrix A that are generated from the pseudorandom data independent of the global system parameter matrix B (elements that are newly generated) when the lattice basis parameter matrix A is generated.

In some cases, the matrices in FIG. 3 have m columns, and the mask matrix P can have a weight ω (indicating the number of "1" values in the mask matrix P), where $\omega \geq m$. All or part of the mask matrix P can be generated based on a portion of the pseudorandom data. For example, the mask matrix P can be a random permutation matrix, and the locations of the "1" values can be determined based on a portion of the pseudorandom data. As another example, the mask matrix P can be a fixed, public parameter (e.g., a global system parameter) for the lattice-based cryptography system. In the example shown in FIG. 3, the binary pattern in the mask matrix P is a checkerboard pattern.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., non-magnetic drives (e.g., a solid-state drive), magnetic disks, magneto optical disks, or optical disks. However, a computer need not have such devices. Moreover, a computer can be embedded in another device, e.g., a phone, an electronic appliance, a mobile audio or video player, a game console, a Global Positioning System (GPS) receiver, an Internet-of-Things (IoT) device, a machine-to-machine (M2M) sensor or actuator, or a portable storage device (e.g., a universal serial bus (USB) flash drive). Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

In a general aspect of the examples described here, a lattice basis parameter for a lattice-based cryptography system is generated.

In a first example, a first parameter (e.g., the B matrix or another type of global system parameter) for a lattice-based cryptography system is obtained. The first parameter is composed of a first set of values. Pseudorandom data are obtained from a pseudorandom generator. A lattice basis parameter (e.g., the A matrix or another type of lattice basis parameter) is generated for the lattice-based cryptography system based on the first parameter and the pseudorandom data. The lattice basis parameter is composed of a second set of values, which includes a first subset selected from the first set of values, and a second subset generated based on the pseudorandom data. The second subset are generated independent of the first parameter. The lattice basis parameter is used to execute a lattice-based cryptography protocol in a communication system.

In a second example, a computing system includes a data processing apparatus and a computer-readable medium storing instructions that are operable when executed by the data processing apparatus to perform one or more operations of the first example.

In a third example, a computer-readable medium stores instructions that are operable when executed by a data processing apparatus to perform one or more operations of the first example.

Implementations of the first, second, or third example may include one or more of the following features. The pseudorandom data can be obtained from the pseudorandom generator based on a seed value for the pseudorandom generator. Executing the lattice-based cryptography protocol can include communicating the seed value, for example, sending the seed value to or receiving the seed value from another entity over a communication network. The lattice basis parameter can be a matrix, and the second subset can include at least one of the values in each row of the matrix, and at least one of the values in each column of the matrix.

Implementations of the first, second, or third example may include one or more of the following features. A mask (e.g., the P matrix or another type of mask) can be obtained. Generating the lattice basis parameter can include selecting the first subset from the first set of values based on the mask. The lattice basis parameter can be a first matrix having m columns, and the mask can be a second matrix having a weight $\omega$, where $\omega \geq m$. All or part of the mask can be generated based on a portion of the pseudorandom data. For example, the mask can be a random permutation matrix generated based on a portion of the pseudorandom data. As another example, the mask can be a fixed, public parameter (e.g., a global system parameter) for the lattice-based cryptography system. In some cases, the fixed, public parameter can be a checkerboard pattern matrix.

Implementations of the first, second, or third example may include one or more of the following features. The first parameter can be a first global system parameter. The first global system parameter can be a global system parameter array, the lattice basis parameter can be a lattice basis parameter array, the mask can be a mask array (e.g., a binary mask), and generating the lattice basis parameter can include, for each position in the lattice basis parameter array: if the mask array has a first value (e.g., "0") at that position, assigning the value from that position in the global system parameter array to that position in the lattice basis parameter array; and if the mask array has a second value (e.g., "1") at that position, assigning a value derived from the pseudorandom data to that position in the lattice basis parameter array. Each of the arrays (the global system parameter array, the lattice basis parameter array, the mask array) can be a vector (a one-dimensional array), a matrix (a two-dimensional array) or another type of array.

Implementations of the first, second, or third example may include one or more of the following features. Using the lattice basis parameter to execute a lattice-based cryptography protocol can include using the lattice basis parameter to execute a key agreement protocol, an encryption protocol, or a signature protocol.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A lattice-based cryptography method comprising:
    obtaining, from a memory of a computer system, a first parameter for a lattice-based cryptography system, wherein the first parameter is a first global system parameter of the lattice-based cryptography system, the first parameter comprising a first set of values;
    obtaining pseudorandom data from a pseudorandom generator;
    obtaining a mask;
    generating, by operation of one or more processors of the computer system, a lattice basis parameter for the lattice-based cryptography system based on the first parameter and the pseudorandom data, the lattice basis parameter comprising a second set of values, the second set of values comprising:
        a first subset selected from the first set of values based on the mask; and
        a second subset based on the pseudorandom data, independent of the first parameter,
        wherein the lattice basis parameter comprises a first matrix having m columns, and the mask comprises a second matrix having a weight $\omega$, where $\omega \geq m$; and
    establishing communication with another computer system using the lattice basis parameter in an execution of a lattice-based cryptography protocol in a communication system.

2. The lattice-based cryptography method of claim 1, comprising obtaining the pseudorandom data from the pseudorandom generator based on a seed value for the pseudorandom generator, wherein executing the lattice-based cryptography protocol comprises sending or receiving the seed value.

3. The lattice-based cryptography method of claim 1, wherein the lattice basis parameter comprises a matrix containing the second set of values, and the second subset comprises:
    at least one of the values in each row of the matrix; and
    at least one of the values in each column of the matrix.

4. The lattice-based cryptography method of claim 1, comprising generating at least a portion of the mask based on a portion of the pseudorandom data.

5. The lattice-based cryptography method of claim 4, comprising generating a random permutation matrix based on a portion of the pseudorandom data, wherein the mask comprises the random permutation matrix.

6. The lattice-based cryptography method of claim 1, wherein the mask is a fixed, public parameter for the lattice-based cryptography system.

7. The lattice-based cryptography method of claim 6, wherein the fixed, public parameter comprises a checkerboard pattern matrix.

8. The lattice-based cryptography method of claim 1, wherein the first global system parameter comprises a global system parameter array, the lattice basis parameter comprises a lattice basis parameter array, the mask comprises a mask array, and generating the lattice basis parameter comprises, for each position in the lattice basis parameter array:
    if the mask array comprises a first value at the corresponding position, assigning the value from the corresponding position in the global system parameter array to that position in the lattice basis parameter array; and
    if the mask array comprises a second value at the corresponding position, assigning a value derived from the pseudorandom data to that position in the lattice basis parameter array.

9. The lattice-based cryptography method of claim 8, wherein the first global system parameter comprises a global system parameter matrix, the lattice basis parameter comprises a lattice basis parameter matrix, and the mask comprises a mask matrix.

10. The lattice-based cryptography method of claim 8, wherein the first global system parameter comprises a global system parameter vector, the lattice basis parameter comprises a lattice basis parameter vector, and the mask comprises a mask vector.

11. The lattice-based cryptography method of claim 1, wherein using the lattice basis parameter to execute a lattice-based cryptography protocol comprises using the lattice basis parameter to execute a key agreement protocol.

12. The lattice-based cryptography method of claim 1, wherein using the lattice basis parameter to execute a lattice-based cryptography protocol comprises using the lattice basis parameter to execute an encryption protocol.

13. The lattice-based cryptography method of claim 1, wherein using the lattice basis parameter to execute a lattice-based cryptography protocol comprises using the lattice basis parameter to execute a signature protocol.

14. A computing system comprising:
    a data processing apparatus;
    a computer-readable medium storing instructions that are operable when executed by the data processing apparatus to perform operations comprising:
        obtaining a first parameter for a lattice-based cryptography system, wherein the first parameter is a first global system parameter of the lattice-based cryptography system, the first parameter comprising a first set of values;
        obtaining a mask;

obtaining pseudorandom data from a pseudorandom generator;
generating a lattice basis parameter for the lattice-based cryptography system based on the first parameter and the pseudorandom data, the lattice basis parameter comprising a second set of values, the second set of values comprising:
  a first subset selected from the first set of values based on the mask;
  a second subset generated based on the pseudorandom data, independent of the first parameter,
  wherein the lattice basis parameter comprises a first matrix having m columns, and the mask comprises a second matrix having a weight $\omega$, where $\omega \geq m$; and
establishing communication with another computing system using the lattice basis parameter in an execution of a lattice-based cryptography protocol in a communication system.

15. The computing system of claim 14, the operations comprising obtaining the pseudorandom data from the pseudorandom generator based on a seed value for the pseudorandom generator, wherein executing the lattice-based cryptography protocol comprises sending or receiving the seed value.

16. The computing system of claim 14, wherein the lattice basis parameter comprises a matrix containing the second set of values, and the second subset comprises:
  at least one of the values in each row of the matrix; and
  at least one of the values in each column of the matrix.

17. The computing system of claim 14, wherein the first global system parameter comprises a global system parameter array, the lattice basis parameter comprises a lattice basis parameter array, the mask comprises a mask array, and generating the lattice basis parameter comprises, for each position in the lattice basis parameter array:
  if the mask array comprises a first value at the corresponding position, assigning the value from the corresponding position in the global system parameter array to that position in the lattice basis parameter array; and
  if the mask array comprises a second value at the corresponding position, assigning a value derived from the pseudorandom data to that position in the lattice basis parameter array.

18. A non-transitory computer readable medium storing instructions that are operable when executed by a data processing apparatus of a computing system to perform operations comprising:
  obtaining a first parameter for a lattice-based cryptography system, wherein the first parameter is a first global system parameter of the lattice-based cryptography system, the first parameter comprising a first set of values;
  obtaining a mask;
  obtaining pseudorandom data from a pseudorandom generator;
  generating a lattice basis parameter for the lattice-based cryptography system based on the first parameter and the pseudorandom data, the lattice basis parameter comprising a second set of values, the second set of values comprising:
    a first subset selected from the first set of values based on the mask; and
    a second subset generated based on the pseudorandom data, independent of the first parameter,
    wherein the lattice basis parameter comprises a first matrix having m columns, and the mask comprises a second matrix having a weight $\omega$, where $\omega \geq m$; and
  establishing communication with another computing system using the lattice basis parameter in an execution of a lattice-based cryptography protocol in a communication system.

19. The computer readable medium of claim 18, wherein the lattice basis parameter comprises a matrix containing the second set of values, and the second subset comprises:
  at least one of the values in each row of the matrix; and
  at least one of the values in each column of the matrix.

20. The computer readable medium of claim 18, wherein the global system parameter comprises a global system parameter array, the lattice basis parameter comprises a lattice basis parameter array, the mask comprises a mask array, and generating the lattice basis parameter comprises, for each position in the lattice basis parameter assay:
  if the mask array comprises a first value at the corresponding position, assigning the value from the corresponding position in the global system parameter array to that position in the lattice basis parameter array;
  if the mask array comprises a second value at the corresponding position, assigning a value derived from the pseudorandom data to that position in the lattice basis parameter array.

* * * * *

UNITED STATES PATENT AND TRADEMARK OFFICE
CERTIFICATE OF CORRECTION

PATENT NO. : 10,097,351 B1
APPLICATION NO. : 15/719235
DATED : October 9, 2018
INVENTOR(S) : Shane Daniel Kelly et al.

Page 1 of 1

It is certified that error appears in the above-identified patent and that said Letters Patent is hereby corrected as shown below:

In the Specification

In Column 11, Line 43, delete "$\Lambda(A)=\Delta(B)$" and insert -- $\Lambda(A)=\Lambda(B)$ -- therefor.

In the Claims

In Column 19, Claim 14, Line 9, after "mask;" insert -- and --.

In Column 20, Claim 20, Line 36, delete "assay:" and insert -- array: -- therefor.

Signed and Sealed this
Eleventh Day of December, 2018

Andrei Iancu
*Director of the United States Patent and Trademark Office*